Sept. 18, 1951 A. M. GUREWITSCH 2,568,447

PHONOGRAPH TONE ARM

Filed Feb. 26, 1948

Inventor:
Anatole M. Gurewitsch,
by Merton D. Morse
His Attorney.

Patented Sept. 18, 1951 2,568,447

UNITED STATES PATENT OFFICE 2,568,447

PHONOGRAPH TONE ARM

Anatole M. Gurewitsch, Schenectady, N. Y., assignor to General Electric Company, a corporation of New York Application February 26, 1948, Serial No. 11,012

2 Claims. (Cl. 274—24)

This invention relates to sound reproducing devices for use with records of the disc type and more particularly to an improved tone arm for use in such devices.

It is an object of this invention to provide such an improved tone arm, which is so arranged that undesirable vibration of the phonograph needle along successive sound grooves of the record is obviated, and substantially distortionless sound reproduction is thereby obtained.

It is a further object of this invention to provide such a tone arm, wherein the reproducing head which carries the phonograph needle is always disposed with its longitudinal axis in a plane tangential to the record grooves along successive convolutions of the record, the needle being therefore shifted in a direction normal to the sound grooves of the record, thereby reducing substantially to zero the component of motion of the needle in the direction of the sound grooves, and hence reducing distortion and unpleasant noise in the reproduced sound.

Yet another object of this invention is to provide such a tone arm in which the reproducing head is always disposed tangential to the sound grooves of the record, the vibration of the needle associated with the head being therefore in such a direction that wear of the record and needle is substantially reduced.

A further object of this invention is to provide such an improved tone arm in which the reproducing head has a disc-like member mounted thereon, this member making a rolling contact in the record grooves, and serving as a guide for the reproducing head so that the longitudinal axis of the head is always disposed tangential to the grooves.

Yet another object of this invention is to provide such an improved tone arm wherein a portion of the weight of the arm is carried by the disc-like member, and the entire weight of the arm is therefore not supported by the needle or stylus.

Figure 1:
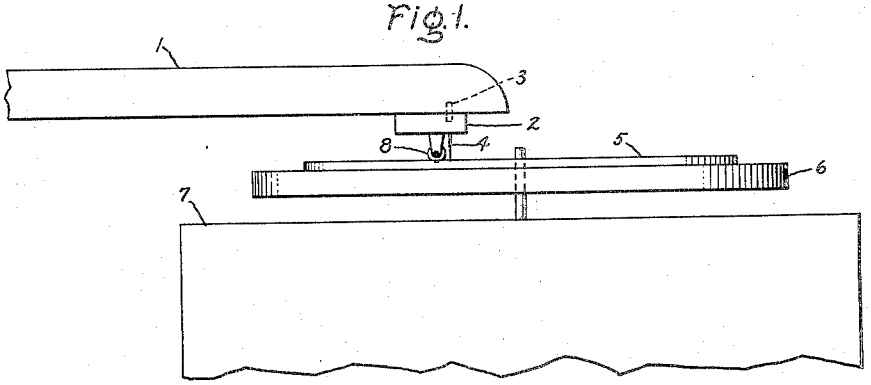
Figure 2:
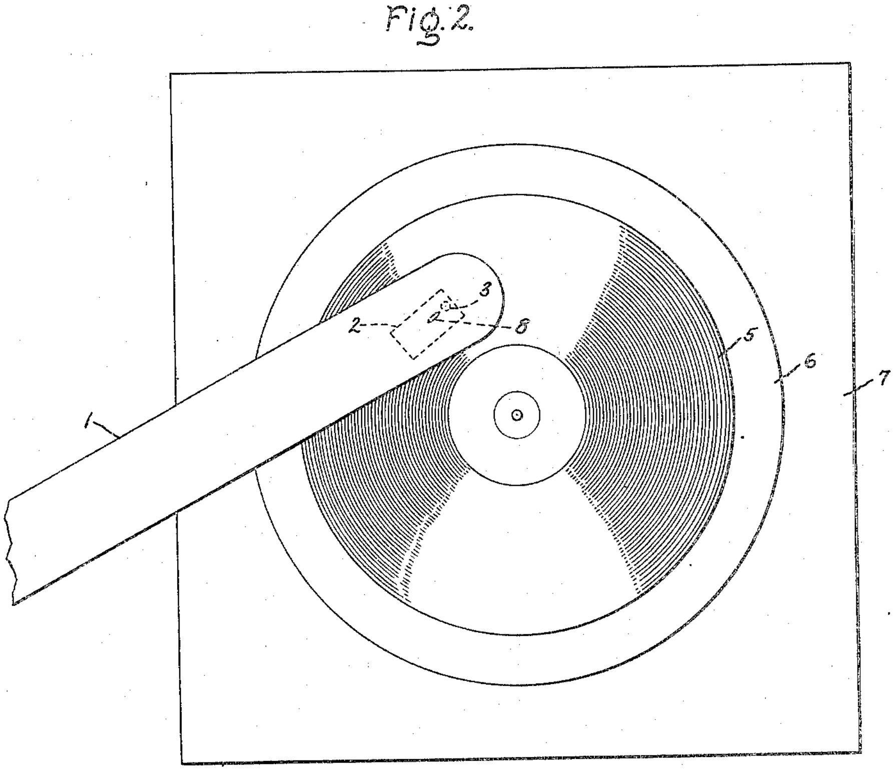

The features of this invention which are believed to be new are set forth with particularity in the appended claims. The invention itself, however, together with further objects and advantages thereof may best be understood by reference to the accompanying drawing, wherein, Fig. 1 shows a side view and Fig. 2 shows a plan view of a sound reproducing system utilizing the present invention.

Referring now to the drawing, a phonograph tone arm is designated as 1, arm 1 having a reproducing head or pickup cartridge 2 rotatably mounted at one end thereof by means of spindle 3. The reproducing head 2 carries a needle or stylus 4 mounted thereon, the longitudinal axis of this needle being aligned with the axis of spindle 3 and this needle making contact with a disc record 5. Disc record 5 is carried on the usual turntable 6 which in turn is mounted on cabinet 7, the usual drive and control mechanism being contained within this cabinet.

As the record 5 revolves, tone arm 1 is moved about a pivot, not shown, as successive convolutions of the record cause needle 4 to follow the grooves from the periphery of the record towards the center. It is evident that for a minimum of distortion in the reproduced sound, and for a minimum of wear on the record, reproducing head 2 must be so arranged that for all positions of arm 1, the longitudinal axis of this head is tangential to the record grooves. In this way the phonograph needle is allowed to vibrate in a plane normal to the sound grooves of the record.

In accordance with the present invention the above prerequisite is accomplished by the provision of a small disc or wheel 8, this disc being mounted on reproducing head 2, as shown. The arrangement is such that the disc 8 follows needle 4 in the grooves of the record, making a rolling contact therein. In view of the fact that head 2 is freely rotatable about spindle 3, the head thereby always has the desired tangential relationship with the sound grooves for any position of arm 1.

This invention therefore provides an extremely simple arrangement by means of which high quality sound reproduction may be obtained with relatively inexpensive apparatus, and whereby the record and needle wear in such apparatus is reduced to a minimum.

While a certain specific embodiment has been shown and described, it will of course be understood that various modifications may be made without departing from the invention. The appended claims are therefore intended to cover any such modifications that fall within the true spirit and scope of the invention.

What I claim as new and desire to secure by Letters Patent is:

1. A tone arm for use in sound reproducing devices of the disc record type, comprising, an arm member, a pin fixed to said member, a reproducing head rotatably mounted on said pin, a phonograph needle mounted on said head having its longitudinal axis aligned with the axis of said pin, a freely rotatable disc-like member similarly mounted on said head and disposed from said needle along the longitudinal axis of said head, said last-mentioned member serving as a guide for said head.

2. A sound reproducing device of the disc record type, comprising, an arm member, a pin fixed to said member, a reproducing head rotatably mounted on said pin, a turntable, a disc record having sound grooves formed therein and carried by said turntable, a phonograph needle mounted on said head having its longitudinal axis aligned with the axis of said pin, said needle making contact with said sound grooves, and a disc-like member similarly mounted on said head and disposed from said needle along the longitudinal axis of said head, said disc-like member making a rolling contact with said sound grooves and acting as a guiding means for disposing said head tangential to said grooves for successive convolutions of said record.

ANATOLE M. GUREWITSCH.

REFERENCES CITED

The following references are of record in the file of this patent:

UNITED STATES PATENTS

| Number | Name | Date |
|---|---|---|
| 1,438,642 | Graham | Dec. 12, 1922 |
| 1,453,637 | Parsons | May 1, 1923 |
| 1,705,017 | Jakosky | Mar. 12, 1929 |
| 2,328,862 | Thompson | Sept. 7, 1943 |
| 2,455,529 | Shortt | Dec. 7, 1948 |

FOREIGN PATENTS

| Number | Country | Date |
|---|---|---|
| 728,245 | France | Apr. 11, 1932 |